United States Patent [19]

Santioni

[11] Patent Number: 5,178,392
[45] Date of Patent: Jan. 12, 1993

[54] GOLF CLUB HEAD

[75] Inventor: Jacky Santioni, Cran Gevrier, France

[73] Assignee: Taylor Made Golf Company, Inc., Carlsbad, Calif.

[21] Appl. No.: 648,983

[22] Filed: Jan. 31, 1991

[30] Foreign Application Priority Data

Jan. 31, 1990 [FR] France ............... 90 01376

[51] Int. Cl.⁵ ............................................. A63B 53/04
[52] U.S. Cl. ........................... 273/167 R; 273/167 H; 273/DIG. 8; 273/77 R
[58] Field of Search ........... 273/167 R, 167 F, 167 H, 273/78, 169-172, 77 R, 193 R, 194 R, 194 A, DIG. 8, DIG. 23, 65 C, 214, 215, 231; 137/846, 849

[56] References Cited

U.S. PATENT DOCUMENTS

| 1,568,888 | 1/1926 | Dunn | 273/167 H |
|---|---|---|---|
| 1,831,255 | 11/1931 | Menzies | 273/81 R |
| 3,450,407 | 6/1969 | Russo | 273/65 EC |
| 4,319,752 | 3/1982 | Thompson | 273/167 H |
| 4,434,810 | 3/1984 | Atkinson | 137/846 X |
| 4,516,778 | 5/1985 | Cleveland | 273/167 H X |
| 4,553,755 | 11/1985 | Yamada | 273/171 |
| 4,714,577 | 12/1987 | Nagamoto et al. | 273/167 H X |
| 4,715,606 | 12/1987 | Varley | 273/171 X |
| 4,803,023 | 2/1989 | Enomoto et al. | 273/167 H X |
| 4,824,116 | 4/1989 | Nagamoto et al. | 273/167 H X |

FOREIGN PATENT DOCUMENTS

| 124401 | 6/1947 | Australia | 273/78 |
| 1-256980 | 10/1989 | Japan . | |

Primary Examiner—V. Millin
Assistant Examiner—Sebastiano Passaniti
Attorney, Agent, or Firm—Pollock, Vande Sande & Priddy

[57] ABSTRACT

A golf club head containing a filling orifice (6) designed for filling an interior cavity (4) with a foaming material (5). The orifice (6) is sealed with an element (7) allowing selective permeability and comprising at least one wall (71) forming the interface between the interior cavity (4) and the outside and through which only gas molecules can excape from the interior cavity (4) to the outside under the pressure exerted by the volume of the foaming material during injection and during its expansion after injection.

28 Claims, 5 Drawing Sheets

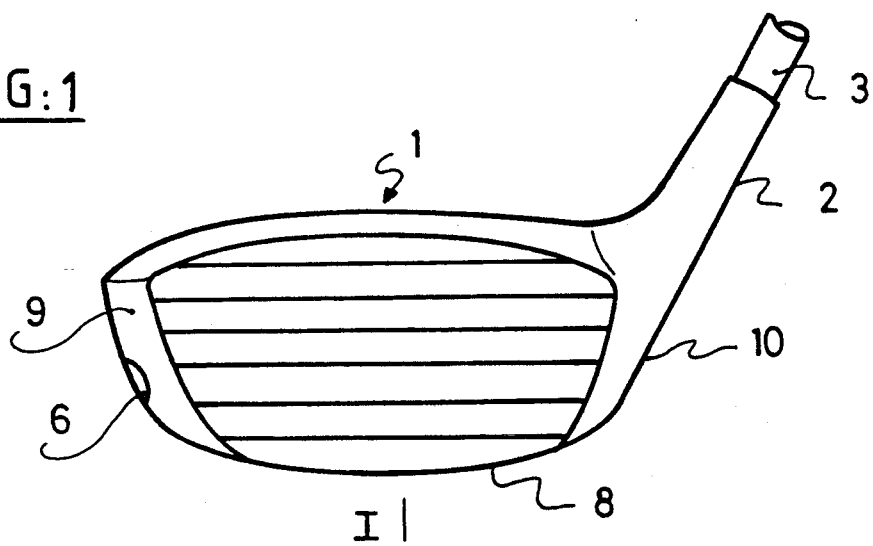
FIG:1
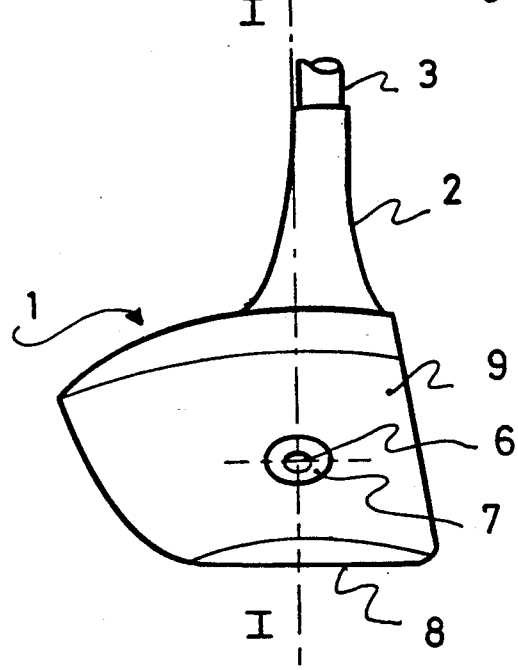
FIG:2
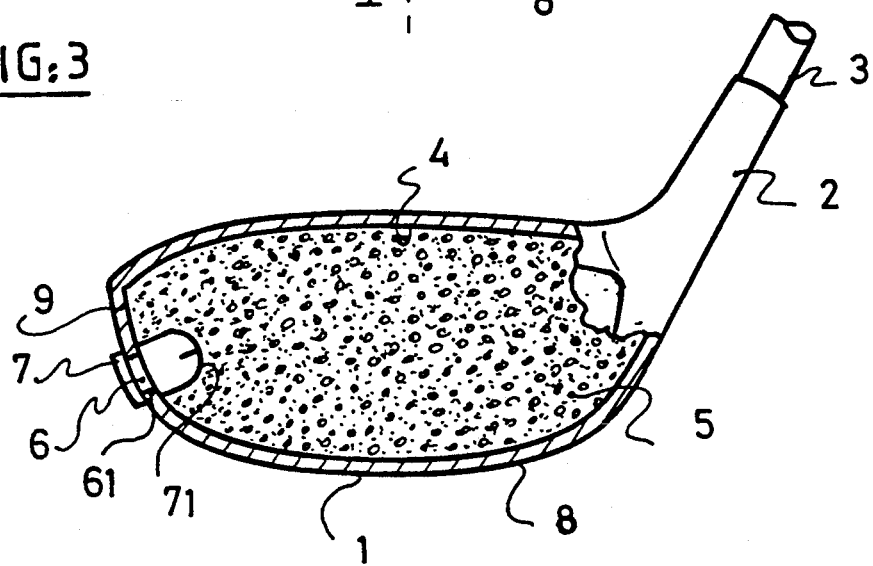
FIG:3

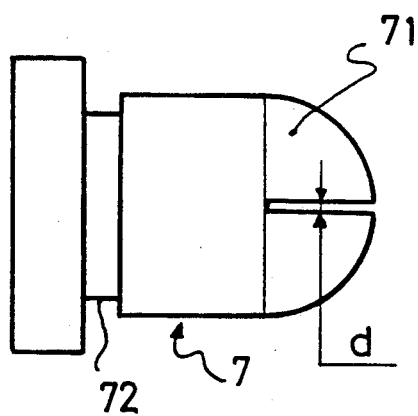
FIG:4
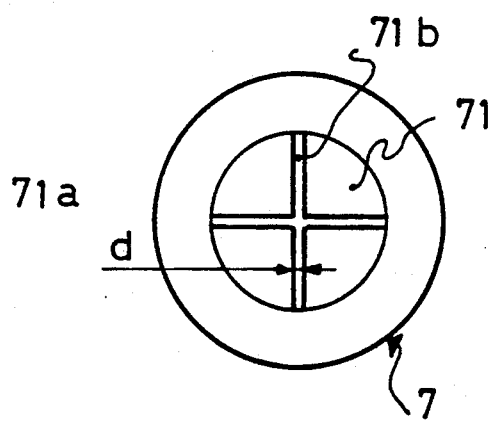
FIG:4a
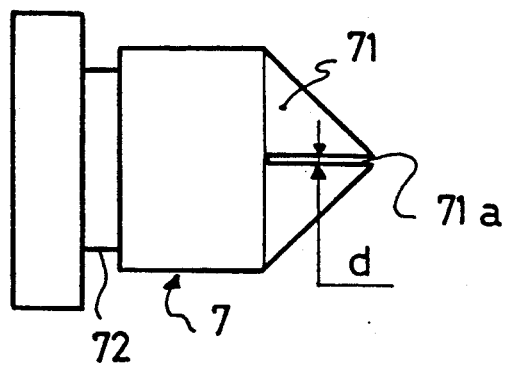
FIG:5
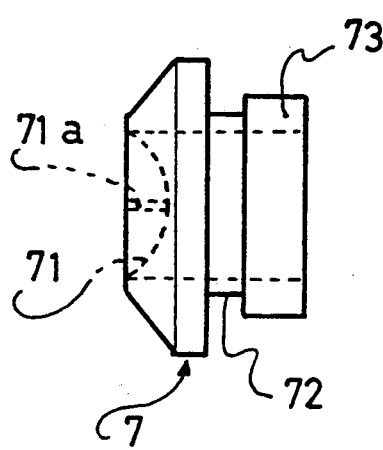
FIG:6
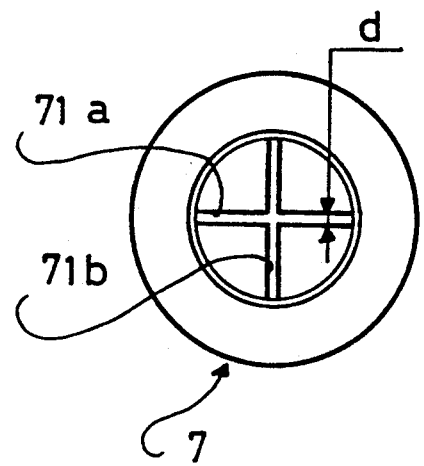
FIG:6a

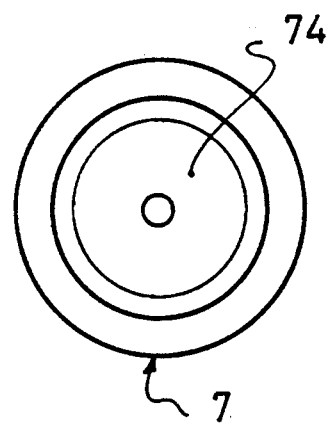
FIG: 7a
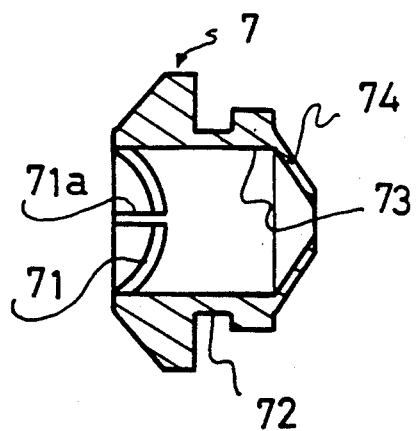
FIG: 7
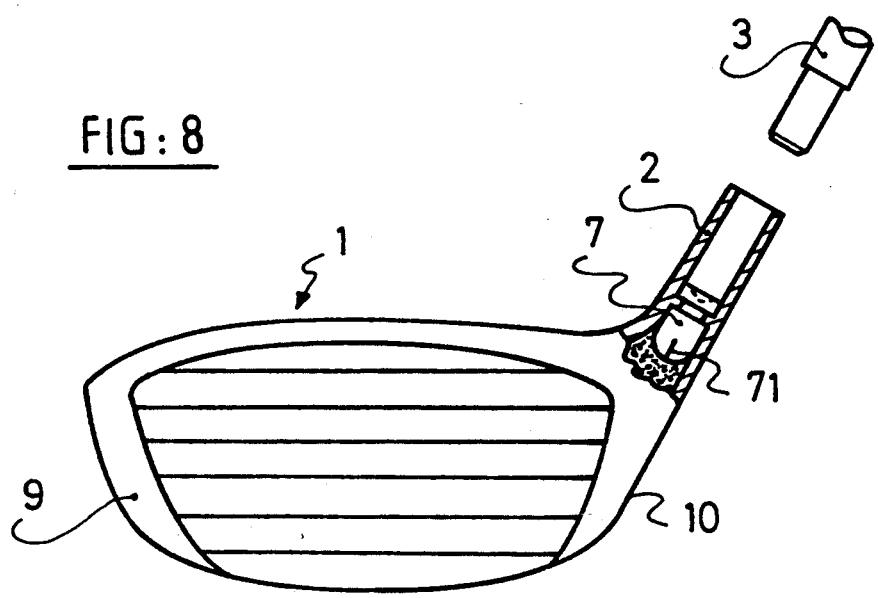
FIG: 8

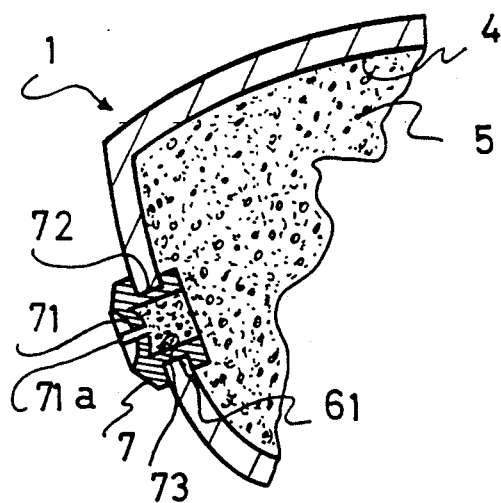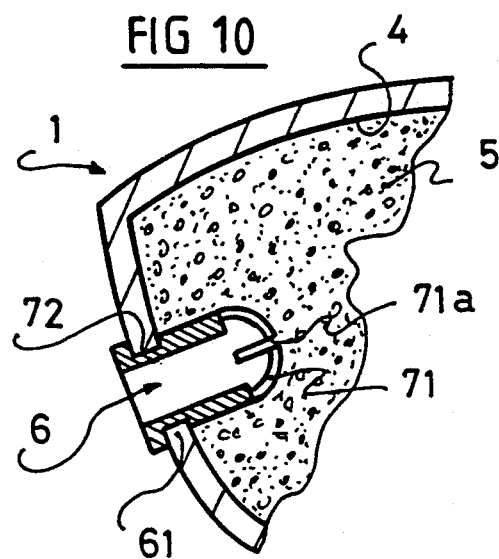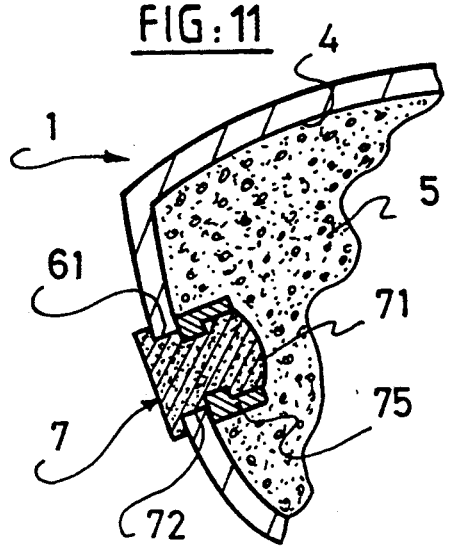

5,178,392

GOLF CLUB HEAD

FIELD OF THE INVENTION

The present invention relates to a golf club head containing an interior cavity designed to receive a filling material.

BACKGROUND OF THE INVENTION

It is known that a golf club comprises a head extended upward by a "hosel" or neck, to which a handle, commonly termed a shaft, is connected. For some golf clubs, especially wood-metal clubs and some irons, a filling material must be injected into the head, for several reasons.

First, the club must be precisely balanced, and the injection of material is thus performed as a final club-balancing operation. Second, for reasons of sound at impact, the interior cavity cannot remain empty.

The injection operation is generally carried out through the neck, thus requiring the operator to dismantle the shaft after verifying club adjustment, and then to remount the shaft and verify the measurement once again, while taking into account, furthermore, the weight of the glue joining the shaft to the neck. This succession of operations often entails adjustment errors.

Furthermore, the injection operation itself is performed through a single hole. The worker inspects visually the expansion of the foam in the cavity through the neck, until it reaches the desired level. A plastic plug is then inserted and fastened in place in order to halt the expansion of the foam until the latter is completely polymerized. The plug is then destroyed by machining through the neck while avoiding any removal of the filling material.

U.S. Pat. No. 4,553,755 discloses an injection procedure carried out through two orifices in the sole plate of a club, one used for the injection of the plastic material and the other for the venting of air during the operation. Once the procedure has been completed, pins are screwed in to ensure impermeability. Nevertheless, the design of this club does not avoid the restrictive visual inspection of the material level.

SUMMARY OF THE INVENTION

The present invention is designed to the above-mentioned difficulties by proposing a golf club head containing a filling orifice designed for the filling of an interior cavity by a filing material. The filling orifice is sealed by an element allowing selective permeability and comprising at least one wall forming the interface between the interior cavity and the outside, and through which only gas molecules can escape from the interior cavity to the outside under the pressure exerted by the volume of the filling material during injection and during expansion of the filing material after injection.

BRIEF DESCRIPTION OF THE DRAWINGS

Other features and advantages of the invention will emerge from the following description furnished by way of example with reference to the attached drawings, in which several embodiments of the invention are shown for purposes of illustration, and in which:

FIG. 1 is a view of the front surface of a golf club according to the invention;

FIG. 2 is a side view of the part of the club in FIG. 1;

FIG. 3 is a cross-section view along line 1——1 in FIG. 2;

FIG. 4 is a side view on a larger scale of an element allowing selective permeability according to the invention;

FIG. 4a is a front view on an enlarged scale of the element in FIG. 4;

FIG. 5 is a large-scale side view of an element allowing selective permeability according to a second embodiment of the invention;

FIG. 6 is a large-scale side view of the element allowing selective permeability according to a third embodiment of the invention;

FIG. 6a is a large-scale frontal view of the element in FIG. 6;

FIG. 7 is a large-scale side view of the element allowing selective permeability according to a fourth embodiment of the invention;

FIG. 7a is a frontal view of the element in FIG. 7;

FIG. 8 is a partial section view of a golf club according to a fifth embodiment of the invention;

FIG. 9 is a partial section view of the element in FIGS. 6 and 6a, positioned on the head of a club;

FIG. 10 is a partial section view of the element in FIGS. 4 and 4a positioned on the head of a club; and FIGS. 11, 12, and 13 are partial section views of elements allowing variable permeability, according to other embodiments of the invention.

DESCRIPTION OF THE PREFERRED EMBODIMENTS

Figure 12:
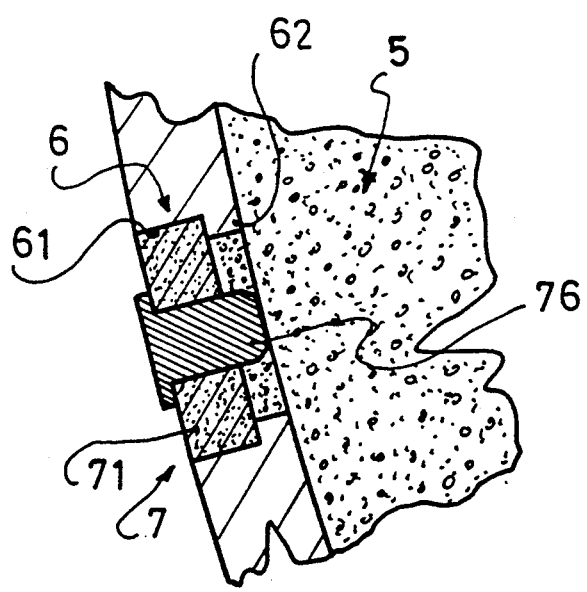

FIG. 1 represents the lower part of a golf club, and more especially of a "wood" comprising a head 1, whose substantially flat lower surface 8 rests on a horizontal plane, and a shaft 3 which fits into the neck 2 of the head 1. This head generally comprises a front surface 9 forming the tip of the club, as opposed to the rear surface 10 called the heel.

This front surface is pierced with a filling orifice 6 which connects with an interior cavity 4 containing a filling material 5, as shown in FIG. 3. This filling orifice 6 is sealed by an element allowing selective permeability 7 and comprising an interface wall 71 forming the interface between the interior cavity and the outside. This interface wall is designed so as to permit only the passage of gas molecules during injection and during the possible expansion of the filling material 5. For this purpose, in the embodiment shown in FIGS. 3, 4, and 4a, the interface wall 71 of the element 7 is made of an elastic, deformable material and comprises at least one groove passing through it, and advantageously two grooves 71a and 71b in the form of a cross. The edges of each groove have, furthermore, a spacing d, preferably less than 0.5 millimeter, so as to prevent the molecules of the filling material from passing through the interface wall 71. Furthermore, the interface wall 71 has the shape of a hemispherical dome or of a cone having a spherical section in the part extending outward from the interior cavity 4, thus allowing a minimum gap between the edges of the grooves when the pressure of the filling material is applied uniformly on this wall.

The element 7 allowing selective permeability further comprises an annular recess 72 in which the edges 61 of the filling orifice are fitted elastically and connect the element 7 on the front surface 9 of the club, elastic interlocking being necessarily sufficiently resistant to internal pressure during the injection or the possible expansion of the filling material 5.

FIGS. 6, 6a, and 9 illustrate another embodiment of the element 7 in which a second cylindrical internal wall 73 extends from the interface wall 71 toward the interior of the internal cavity 4, thus forming a tube so as to limit the pressure exerted on the interface wall at the section created by this cylindrical wall 73.

As shown in FIGS. 7 and 7a, the tube 73 can also be formed so that its end is extended by a narrowed section zone 74, so as to reduce the pressure exerted on the interface wall 71.

The element 7 allowing selective impermeability is advantageously selected from among conventional plastic materials or elastomers such as thermoplastic polyurethanes, polyamides, or copolymers of polyamides, butadiene styrene acrylonitriles, polyethylenes and polyethylene copolymers, and vinyl polychlorides.

Excellent results have been obtained in particular by using a duroplastic filling material 5, such as an expanded polyurethane foam and an element 7 allowing selective permeability made of a thermoplastic polyurethane.

FIG. 11 shows that the interface wall 71 of the element 7 allowing selective permeability may also be made of a porous material having an average pore diameter of less than 50 microns, and advantageously ranging from 10 to 30 microns. Pore diameters are chosen so as to allow selective passage of molecules. Thus, the long polymer chains of the filling material cannot cross the interface wall, while, under internal pressure, the short chains of gas molecules escape freely to the outside of the head. The interface wall may comprise a porous pellet made of sintered plastic or sintered metal, or, for example, formed by stacking layers of textile or cellulose fibers. Applicant prefers the use of a microporous plastic material of the high-density polyethylene type.

In these cases, the element 7 allowing selective permeability may be made compressible on its periphery by means of an elastic deformable ring 75, in order to allow the elastic interlocking of the annular recess 72 with the edges 61 of the filling orifice 6. This ring 75 may be connected to the pellet by any means, such as interlocking and gluing.

FIG. 12 shows a specific embodiment of the use of a pellet made of a porous material.

The element 7 allowing selective permeability comprises a ring-shaped interface wall 71 made of microporous plastic. The wall 71 is stopped against a shoulder 62 on the orifice 6. The internal space of the ring-shaped wall 71 is sealed by a plug 76 made of a hard, impermeable plastic material.

The diameter of the plug 76 is chosen so that the wall is held compressed against the edges of the orifice 61 and can withstand the internal pressure exerted by the foam.

Figure 13:
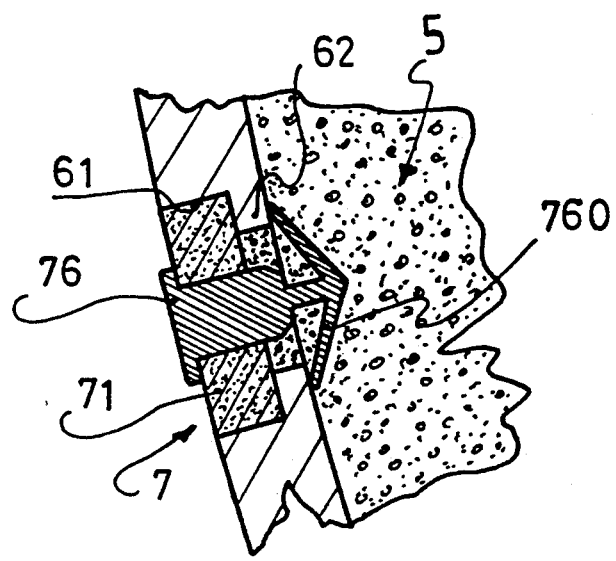

FIG. 13 illustrates an improvement of the embodiment in FIG. 12, and especially of the plug 76, which is designed for better resistance to internal pressure. This plug is prolonged inside the interior cavity 4 by an anchor 760 whose arms are unfolded after insertion inside the cavity 4, so that their ends extend beyond the internal diameter of the edges of the shoulder 62 of the filling orifice 6.

The plug is preferably made of a plastic material, for example of a single piece of polyamide.

The principle underlying the filling of a club head according to the invention is simple. After manufacture and complete assembly of the club components, the operator inspects the balance and determines the quantity of material to be injected. The orifice is sealed by the element allowing selective permeability before injection, when the interface wall is deformable and elastic and is fitted with grooves to allow the passage of the injection nozzle.

The element then acts as an injection valve. After injection, the filling material expands and air and the gases produced by the reaction escape through the grooves which have partially reclosed, but which clear a space sufficient for the passage of these molecules. The foam is, on the contrary, held in place by this valve and polymerized. Depending on the type of material employed, this polymerization also causes the bonding of the grooves, thus ensuring total impermeability.

The orifice is sealed after injection by the element 7 allowing selective permeability, only when the injection wall is porous and does not allow the passage of the injection nozzle. In this case, the element is put in position between the moment when the nozzle is removed and the beginning of the expansion reaction of the foam, which triggers the release of gas.

The present invention lends itself to numerous variants. E.g., as shown in FIG. 8, the filling orifice may be positioned through the neck 2.

A simple hole of less than 0.5 millimeter may also replace the groove or grooves provided in the interface wall.

Similarly, the element allowing selective permeability may be attached on the edges of the filling orifice by screwing, welding, or any other means.

What is claimed is:

1. Golf club head containing a filling orifice (6) for filling an interior cavity (4) with a foaming material (5), wherein said filling orifice (6) is sealed by an element (7) allowing selective permeability and comprising at least one wall (71) forming an interface wall between said interior cavity (4) and an exterior of said gold club head, said element (7) permitting only gas molecules to escape from said interior cavity (4) to said exterior under pressure exerted by a volume of foaming material during injection and expansion of said foaming material after injection.

2. Golf club head according to claim 1, wherein said filling orifice (6) is located on a surface (9) constituting a tip of said head.

3. Golf club head according to claim 1, wherein a part of said interface wall (71) extending within said interior cavity (4) has a conical shape of spherical section.

4. Golf club head according to claim 1, wherein said element (7) allowing selective permeability comprises an annular recess (72).

5. Golf club head according to claim 1, wherein said head is a wood-type head.

6. Golf club head according to claim 1, wherein said head is an iron-type head.

7. Golf club head according to claim 1, wherein said head is a putter head.

8. Golf club head according to claim 1, comprising an upper portion with a neck (2) connected to a shaft (3).

9. Golf club head according to claim 8, wherein said filling orifice (6) is located in said neck (2).

10. Golf club head according to claim 1, wherein a part of said interface wall (71) extending within said interior cavity (4) has a hemispherical dome shape.

11. Golf club head according to claim 10, wherein said interface wall (71) extend within said interior cavity (4) and a second interior cylindrical wall forms a tube (73).

12. Golf club head according to claim 11, wherein said tube (73) comprises an end area having a narrowed frustoconical section extending within said interior cavity (4).

13. Golf club head according to claim 1, wherein said foaming material (5) is an expanded duroplastic foam.

14. Golf club head according to claim 13, wherein said foaming material (5) is an expanded polyurethane.

15. Golf club head according to claim 1, wherein said interface wall (71) is made of porous material having average pore diameters of less than 50 microns.

16. Golf club head according to claim 15, wherein said interface wall (71) is composed of a pellet made of sintered plastic.

17. Golf club head according to claim 15, wherein said interface wall (71) is composed of a pellet made of sintered metal.

18. golf club head according to claim 15, wherein said element (7) allowing selective permeability is enclosed by a ring made of an elastic deformable material (75) forming a shoulder designed for elastically interlocking said ring on edges (61) of said filling orifice (6).

19. Golf club head according to claim 15, wherein said interface wall (71) comprises stacked layers of fibers.

20. Golf club head according to claim 19, wherein said fibers are textile fibers.

21. Golf club head according to claim 19, wherein said fibers are cellulose fibers.

22. Golf club head according to claim 1, wherein said interface wall (71) is made of an elastic, deformable material.

23. Golf club head according to claim 22, wherein at least one hole having a diameter of less than 0.5 millimeter passes through said interface wall (71).

24. Golf club head according to claim 22, wherein said wall (71) comprises at least one groove (71a, 71b).

25. Golf club head according to claim 24, wherein said wall (71) comprises two grooves (71a, 71b) having substantially the shape of a cross.

26. Golf club head according to claim 25, wherein edges of each of said grooves (71a, 71b) have an average separation of less than 0.5 millimeter.

27. Golf club head according to claim 22, wherein said interface wall (71) is made of a plastic material.

28. Golf club head according to claim 27, wherein said interface wall (71) is made of a material chosen from the group consisting of thermoplastic polyurethanes, polyamides and polyamide copolymers, vinyl polychlorides, butadiene styrene acrylonitrile, or polyethylene and polyethylene copolymers.

* * * * *